United States Patent [19]

Richards

[11] Patent Number: 5,221,702
[45] Date of Patent: Jun. 22, 1993

[54] COMPOSITE BLOCK & PROCESS FOR MANUFACTURING

[75] Inventor: Denis C. Richards, Mississauga, Canada

[73] Assignee: Enviropaver Inc., Brampton, Canada

[21] Appl. No.: 804,068

[22] Filed: Dec. 9, 1991

[51] Int. Cl.⁵ .................... C08L 95/00; C08L 1/24
[52] U.S. Cl. ............................. 524/59; 524/68; 524/36; 524/40
[58] Field of Search ............... 524/59, 68, 36, 40

[56] References Cited

U.S. PATENT DOCUMENTS

| | | | |
|---|---|---|---|
| 917,004 | 4/1909 | Clifford | 404/44 |
| 1,281,444 | 10/1918 | Wardell | 404/44 |
| 1,629,487 | 5/1927 | Draullette | 404/44 |
| 1,740,212 | 12/1929 | Warren | 404/32 |
| 3,253,521 | 5/1966 | Endres | 404/32 |
| 3,732,791 | 5/1973 | Hohwiller | 404/31 |
| 3,891,585 | 6/1975 | McDonald | 260/28.5 AS |
| 4,018,730 | 4/1977 | McDonald | 260/17.4 R |
| 4,130,516 | 12/1978 | Gagle et al. | 260/28.5 AS |
| 4,284,366 | 8/1981 | Lucik | 404/44 |
| 4,332,705 | 6/1982 | Uffner | 525/54.5 |
| 4,427,818 | 1/1984 | Prusinski | 524/442 |
| 4,659,759 | 4/1987 | Jevanoff et al. | 524/68 |
| 4,868,233 | 9/1989 | Moran | 524/71 |
| 4,873,275 | 10/1989 | Moren | 524/64 |
| 4,882,373 | 11/1989 | Moran | 524/68 |
| 4,963,055 | 10/1990 | Sims, Jr. | 404/41 |

FOREIGN PATENT DOCUMENTS

| | | |
|---|---|---|
| 0014646 | 8/1980 | European Pat. Off. . |
| 0356066 | 2/1990 | European Pat. Off. . |
| 57-66206 | 4/1982 | Japan ................... 404/32 |

OTHER PUBLICATIONS

929 Travaux (1982) Jul.-Aug., No. 568, Paris, France "le Béton Bitumineux Armé" 61-66.

Primary Examiner—Paul R. Michl
Assistant Examiner—LaVonda DeWitt
Attorney, Agent, or Firm—Donald E. Hewson

[57] ABSTRACT

A composite paving block formed from desired proportions of asphalt, plastic such as polyethylene or phenolic resin, elastomeric material such as rubber or polyvinylchloride, and fibre material such as nylon or rayon, is disclosed. Recycled or reclaimed materials such as reclaimed asphalt, recycled polyethylene bottles, and recycled tires may be used. The materials are heated and blended together into a relatively uniform mixture of composite material. The composite material is further heated and is then molded into individual paving blocks, which exhibit a property of very high compressive strength.

26 Claims, 2 Drawing Sheets

COMPOSITE BLOCK & PROCESS FOR MANUFACTURING

FIELD OF THE INVENTION

This invention relates to materials for forming construction blocks and more particularly to materials for forming interlocking paving blocks used to construct roads, parking lots, driveways and the like.

BACKGROUND OF THE INVENTION

In North America, and indeed in most of the civilized and populated areas of the world, roads have become an integral part of cities, towns, suburbs, and so on. Indeed, most towns and cities contain hundreds or thousands of miles of roads within their boundaries, and also driveways or parking lots for virtually every building within a city or town.

The conventional way and indeed the most popular way to provide roads, driveways, and parking lots with a top surface is to use asphalt for the top surface. A best estimate is that several million miles of roads and several million acres of parking lots within North America are surfaced with asphalt.

However, there are two fundamental problems with asphalt. One problem is that asphalt is oil based, or at least largely so, and therefore a raw material that is in limited supply is being used when it could be being used for other purposes. Secondly, there is a question of durability, which is now generally recognized as a very significant problem. Many existing roadways and parking lots, even very new ones, are degraded considerably largely due to broken asphalt, and cracks or potholes can be found at any given time. The amount of asphalt roadway in North America that has asphalt damage is quite extensive. Most of the damage is caused by weather cycles, which cause expansion and contraction of the asphalt. Any roadway that does not have asphalt damage has most likely been constructed or repaired in the last few years. This is generally unsightly and also quite expensive. Further, oil and other fluids that drip from vehicles while the vehicle is parked or in motion also cause a significant problem. The amount of damage that is done by oil and other fluids from vehicles is considerable. This damage can be seen in virtually every parking lot, driveway, and roadway intersection in North America. Not only does the oil, or whatever fluid that might be leaking from a vehicle, leave a very unsightly stain on the asphalt surface of a roadway, parking lot or driveway, the asphalt surface in time will start to degrade to a point where it is crumbling and needs to be replaced.

While it is possible to replace small portions of the asphalt surface, at least in most cases, this leaves an unsightly patch—or indeed several patches—of new asphalt.

One alternative that has been recently fairly widely accepted in North America as an alternative for resurfacing driveways and small parking lots is interlocking blocks. Interlocking blocks are made of a cementitious or a cement based material having a small relatively constant sized aggregate therein. These blocks come in various shapes and sizes. Basically, these blocks interfit with one another such that the blocks can be installed on a surface to completely cover the surface. The blocks may need to be cut around the perimeter of a surface in order to fit exactly to the outline of the surface. Among the advantages of interlocking blocks are that they do not require the same heavy equipment to install as it takes to create a surface of asphalt, they are easy to replace, only the damaged blocks need replacing which can be done relatively quickly and inexpensively, and they last much longer than an asphalt surface and are much more resistant to damage—including weathering, impact, and leaking oil. They are, however, more expensive to install initially than an asphalt surface, although the cost factor can be spread over many more years since interlocking blocks are much more durable than asphalt. Further, it generally takes longer to install a given area of interlocking blocks than to pave the same area with asphalt, which adds to the initial cost. Largely because of the lower initial cost, many parking lots and driveways are still paved with asphalt instead of surfaces with interlocking blocks. However, because of the long term cost benefits, it is becoming more and more acceptable to use interlocking blocks even where cost is an important and an accountable factor, such as in municipal roads and parking lots or shopping mall and office complex parking lots.

Another advantage of interlocking blocks is that they can, in most cases, allow for ground movement without breaking. The blocks merely shift slightly with respect to one another or in some cases separate slightly from one another, which is usually acceptable. Further, moisture can pass between interlocking blocks which means that normal water seepage into the ground is not interfered with significantly.

Another problem with the present interlocking blocks is that they are concrete based and therefore somewhat porous. This means that they can absorb water which tends to cause them to crack or break during the winter.

PRIOR ART

The prior art includes basically asphalt surfaces and interlocking paving blocks made mainly of cement based materials.

However, several patents relating generally to the subject matter hereof are discussed below, for the record:

U.S. Pat. No. 1,740,212 issued Dec. 17, 1929 to WARREN, discloses a bituminous composition and the manufacture thereof. This bituminous composition comprises an admixture of rubber with bituminous cement. Further, an admixture of fibre is added thereto.

U.S. Pat. No. 3,253,521 issued May 31, 1966 to ENDRES, discloses a flexible paving composition wherein to surface a roadway, a rubberized bituminous adhesive is applied to the surface and then a cover of paving composition is applied thereto, while the adhesive is in a condition to adhere the composition to the surface. The paving composition comprises a mixture of rubberized bitumen and particulated rubber.

U.S. Pat. No. 3,891,585 issued Jun. 24, 1975 to MCDONALD, discloses an elastomeric pavement repair composition wherein asphalt is heated and rubber is combined therewith. The resulting composition is mixed to form a hot jellied composition which can be applied to cracked or distressed pavements.

U.S. Pat. No. 4,284,366 issued Aug. 18, 1981 to LUCIK, discloses an elastomeric composite pavement wherein a molded paving unit is formed as a composite of a resilient base material and a friction aggregate. The particles of the aggregate are disposed in the base material throughout the thickness of the paving unit. The resilient base material includes a binder material such as rubber—more specifically EPDM. Alternate layers of friction aggregate and elastomeric binder material are laid into a cavity to form the molded paving unit.

U.S. Pat. No. 4,427,818 issued Jan. 24, 1984 to PRUSINSKI, discloses a thermoplastic polymer concrete structure and method wherein a thermoplastic polymer concrete block is constructed of contaminated thermoplastic resin scrap, and fill material. The fill material may include sand particles, fibrous particles such as threads, and other waste materials such as metal chips. The mixture is heated and mixed and then placed into molds of a desired shape, and ultimately cooled.

U.S. Pat. No. 4,868,233 issued Sep. 19, 1989 to MORAN, discloses a polyethylene modified asphalt wherein certain linear polyethylene compounds are added to an asphalt that is low in asphaltenes but relatively high in saturates. The resulting composition has excellent storage stability, face compatibility and creep resistance relative to unmodified asphalts. The improved asphaltic composition is particularly well suited for use as a binder in paving materials and as a coating or saturant for roofing products.

In U.S. Pat. No. 4,873,275 issued Oct. 10, 1989 to MORAN et al, it is disclosed that paving asphalts (especially of the hot mix, hot laid type) may be modified so as to have improved stability and rheological properties by the addition of certain co-polymers of ethylene with a vinyl acetate or lower alkyl esters of acrylic acid and methacrylic acid to the asphalt, provided the asphalt has an asphaltene content below a critical level. More specifically, an asphalt cement or binder having both enhanced storage stability and creep resistance relative to conventional binders is formed when the asphalt used in the binder has an asphaltene content of about 7% (by weight) or less, based on percentage of weight of the asphalt. One embodiment disclosed provides an improvement in paving structures wherein the binder in the structures comprises an asphalt containing about 7% (by weight) or less asphaltenes and from about 3.5% to about 10% (by weight) of a co-polymer of ethylene, and from 3% to about 30% (by weight) vinyl-acetate, alkyl acrylate or alkyl methacrylate. Another embodiment of the invention incorporates into the asphalt used in the binders, from about 3.5% to about 10% by weight of a co-polymer of ethylene which contains from 3% to about 30% (by weight) vinylacetate, alkyl acrylate or alkyl methacrylate. The composition disclosed in the patent is said to be particularly suitable for use as a binder in the load bearing course as well as the top or surface course of pavement structures, particularly hot mix pavement structures.

U.S. Pat. No. 4,882,373 issued Nov. 21, 1989 to MORAN, discloses that an asphaltic composition comprising a mineral acid, a thermoplastic elastomer and an unsaturated functional monomer, has improved tensile properties relative to that obtained in the absence of the unsaturated functional monomer.

Japanese Patent Publication 57-66206 published Apr. 22, 1982 discloses a method of manufacturing asphalt by using a hot asphalt mixture combined with a pasty rubber composition. The rubber composition consists of a 2:1 to 1:3 mixture of a rubber latex and a powdery polyolefinic polymer, having a melt index of 20 to 400 and a grain size of 0.3 m.m. or less.

In the prior art, it is not disclosed to use both an elastomeric material and a polyethylene material in the same asphalt mix. Further, the use of a fibre material interspersed within the asphalt the polyethylene mixture is not contemplated. Moreover, the prior art does not contemplate to use the materials in the prior art to form blocks or the like to use as elements for paving or similar.

SUMMARY OF THE INVENTION

The present invention provides a molded paving block that is to be used in the surfacing and resurfacing of roads, parking lots, sidewalks and other walkways, airport runways and tarmacs, and the like. The molded paving blocks of the present invention are to be used substantially in the same manner as presently available interlocking blocks. The molded paving block of the present invention is made of a composite material which includes asphalt, plastic, rubber and monofilament fibre material. Use of these components to form a resulting composite material provides a block that is extremely strong, durable, resistant to cracking and chipping, and so on.

Preferably, the molded paving blocks of the present invention will be in the shape of a rectangular prism—basically the same shape as a typical brick that is used in the construction of a building. Other shapes can of course be manufactured and used.

The materials used are preferably previously used materials such as reclaimed asphalt, recycled plastic such as polyethylene containers, reclaimed elastomeric material such as rubber from scrap tires, and reclaimed monofilament fibre material such as nylon, rayon, or KEVLAR ™ cords from scrap tires. The materials may also be new materials. There are many advantages to using reclaimed or recycled materials such as reduction of waste and also lower cost of raw materials.

The proportional amounts of materials in the composite material include asphalt in a proportion of about 25% to about 55% by volume, polyethylene in a proportion of about 10% to about 40% by volume, monofilament fibre material in a proportion of about 5% to about 35% by volume, and elastomeric material in a proportion of 5% to about 30% by volume. The proportions of the materials that make up the composite material must of course add up to 100%. The preferred proportional amounts of materials include asphalt in a proportion of about 40% by volume, polyethylene in a proportion of about 25% by volume, monofilament fibre material in a proportion of about 20% by volume, and elastomeric material in a proportion of about 15% by volume.

The asphalt should generally be the main or prevalent constituent of the composite material that forms the composite block of the present invention. The asphalt provides the mass and strength of the composite material due to the aggregate within the asphalt. Further, the asphalt contains resins composed largely of hydro-carbons. These hydro-carbons intermingle and bond with the plastic, which is preferably polyethylene, thus creating a binding agent within the material. Further, the plastic physically stabilizes the asphalt and therefore precludes deformation due to extreme temperatures. The monofilament fibres act to reinforce the binding agent thereby providing additional strength to the composite material. The elastomeric material—typically rubber—acts as a flexural extender and thereby provides a measure of resilience to the composite material. It is also quite acceptable to use flexible polyvinylchloride in place of rubber as the elastomeric material. The enhanced resilience lessens the chance of the composite block cracking or breaking due to extreme temperatures or due to high loads or impact forces.

Further, the present invention provides a process for manufacturing molded paving blocks, comprising the steps of placing asphalt and polyethylene into a heated blending drum, blending and heating the asphalt and the polyethylene at a temperature of about 175° F. until a substantially uniform mixture is obtained, adding an amount of elastomeric material and an amount of a monofilament fibre material to the mixture to obtain a composite material that is to be subsequently formed into the composite paving blocks, discharging said composite material into a heating oven, allowing the composite material to temperature stabilize in the heating oven at a temperature of about 325° F. to 375° F., and discharging the composite material from the heating oven and then depositing the composite material into a molding system and molding portions of the composite material into a molded paying block.

In one embodiment of the invention, the composite material is entered into the heating oven in separate portions of a pre-determined weight. The portions are separated to the correct weight of a paving block of desired size by a computer controlled batch dispensing system.

In another embodiment the composite material is entered into the heating oven as a continuous ribbon of material. Upon exiting the oven, the material is pre-plasticized and extruded and is then cut into portions of precise volume. These portions of composite material are then deposited into the molding system.

DETAILED DESCRIPTION OF THE PREFERRED EMBODIMENTS AND PROCESSES

Figure 1:
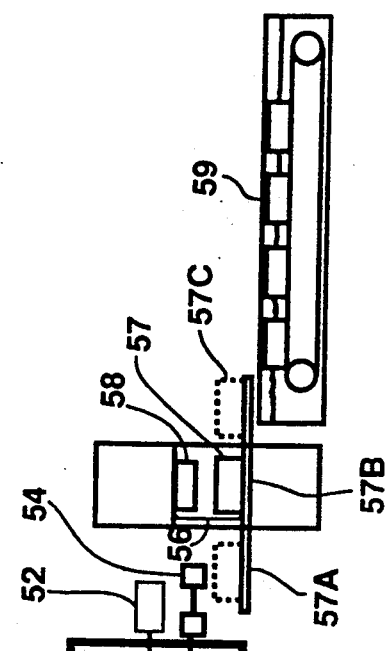
FIG. 1 is a schematic diagram of a first process used to produce the molded paving block of the present invention.
Figure 1:
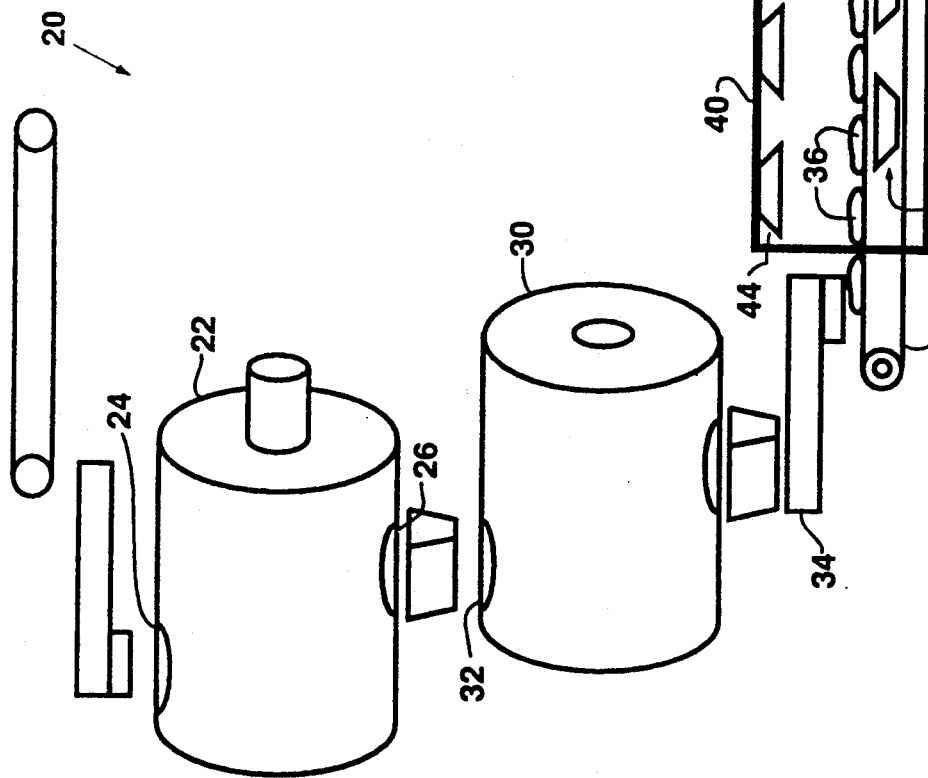

Reference will now be made to FIG. 1 which provides a schematic representation of a first preferred process used to form the composite paving block of the present invention. At the start of a production line 20, there is a blending drum 22. The various materials that are the components of the resulting composite material are entered into the blending drum 22, generally one at a time. In the preferred process, the blending drum 22 contains a mixture of asphalt, plastic, monofilament fibre material and elastomeric material. This mixture is blended in the rotating blending drum 22 until the various component materials are suitably blended together, as will be described in more detail subsequently.

The asphalt is preferably reclaimed asphalt that has been crushed and subsequently screened such the that the pieces are of a size of −4 mesh. The mesh measurement used is an industry standard Tyler mesh. The term −4 mesh refers to fragmented or particulate material having a particle size of less than a 4 mesh.

The plastic is preferably recycled crushed plastic and should be of a size of −30 mesh. The preferred plastic material is polyethylene. Phenolic resins may also be used. It is common to reclaim several types of plastic through recycling programs, with polyethylene. Inclusion of these other types of plastics in a small amount is not detrimental to the properties of the resulting end material that ultimately forms the paving block. Unexpectedly, it has been found that inclusion of other types of plastics in fairly large proportions—even as much as 90% of the entire plastic content, with the rest being polyethylene—has produced an acceptable resulting end material. Tests have shown that paving blocks made of such material merely have a lower strength, but in general retain a similar structural integrity to those blocks containing virtually 100% polyethylene as the plastic material.

The monofilament fibre material is preferably reclaimed monofilament fibre material that has been reclaimed from sources such as scrap tires and is typically recovered from the tires by a cryogenic process. Preferably, the material is chosen from the group of rayon, nylon, and similar polyesters. Further, the monofilament fibre material should have a strand length preferably between $\frac{1}{4}$" and $\frac{3}{8}$" with the ideal strand length being around $\frac{1}{4}$". The monofilament strands recovered from scrap tires may be cut to this length by use of a suitable grinder. The monofilament fibre material is blown into the blending drum when the other component materials, or at least most of the other component materials, are in the blending drum 22 and while the blending drum 22 is rotating in order to achieve proper dispersion.

The elastomeric material is preferably reclaimed rubber that has been reclaimed from sources such as scrap tires. The preferred process for producing such reclaimed rubber is a cryogenic process, which is well known in the industry. The rubber that is produced by a suitable cryogenic process or a suitable ambient reduction process, is preferably crumb rubber that is free from other materials found in the tires. The particles of crumb rubber should be of a size of −12 mesh. It is also quite acceptable to use flexible polyvinylchloride as the elastomeric material.

These material are entered into the blending drum 22 through a receiving hatch 24. The asphalt, polyethylene, and elastomeric material can be deposited separately from one another, or all together, as is convenient. It is preferable, as stated previously, to have the monofilament fibre material blown into the blending drum. It is important that the materials be in certain proportions within the blending drum 22. The preferred proportions are about 40% asphalt, about 25% plastic, about 20% monofilament fibre material and about 15% elastomeric material. These percentages are all expressed in terms of percent by volume. An acceptable range for each of these materials is from about 25% to about 55% asphalt, from about 10% to about 40% plastic, from about 5% to about 35% monofilament fibre material and from about 5% to about 30% elastomeric material. The percentages of course add up to 100%.

After all of the materials have been placed in the blending drum 22, the blending drum 22 is rotated in order to blend the materials together into a uniformly distributed mixture. The blending drum 22 is heated in order to drive off excess moisture in the plastic, asphalt and the elastomeric material. It has been found that a temperature of about 130° F. is useful in providing the proper heat for causing the excess moisture to be vapourized. It is useful in terms of energy efficiency to have water removed at this stage so that it will not absorb heat energy in a subsequent heating stage. Some fluidizing of the mixture occurs, but the mixture does not reach complete fluidity. The drum 22 must be rotated at a speed of between 10 r.p.m. and 35 r.p.m. in order to blend the materials properly such that they are evenly dispersed throughout the mixture. It has been found that the blending drum 22 should not be rotated faster than 35 r.p.m. because the drum 22 then acts as a centrifuge and causes the materials to separate, or at least to not blend properly, due to centrifugal force.

The mixture is thoroughly blended in the blending drum 22, so that the materials become evenly dispersed to form a composite material that will be properly stabilized—with respect to chemistry and dimensions—when a paving block is ultimately formed. The composite material is removed from the heated blending drum through a discharge port 26, and is fed by gravity into a heated holding drum 30 through a receiving hatch 32. The heated blending drum 22 is stopped so that the material can be removed. Alternatively, it is possible to use a continuous extractor, such as a screw feed type extractor, to remove the composite material from the blending drum 22 through an opening in the end thereof, while the blending drum 22 is either stopped or rotating.

The holding drum 30 preferably rotates during the processing operation in order to keep the various components in the composite material from separating. The preferred rotational speed of the holding drum 30 is generally in the same speed range as the blending drum 22, or in a slightly slower speed range, below 10 r.p.m.

The composite material is removed from the holding drum 30 generally on a continuous basis, either as the holding drum 30 is rotating or when it is stopped. The holding drum 30 acts as a physical buffer for the composite material so that a generally continuous supply of the composite material can be provided to the remainder of the system. The overall process described herein will of course work without the holding drum 30, but the output in terms of number of blocks per unit time will not be maximized.

From the holding drum 30, the composite material is metered through a discharge port 26 into a receiving hopper 34 of a computer controlled batch dispensing system. The batch dispensing system continuously measures the amount of the composite material in the receiving hopper 34. When the proper amount of material for forming one moulded paving block has been received by the receiving hopper 34 the material is removed from the receiving hopper as a discrete portion of composite material 36, and is deposited into a continuous feed heating oven 40. The continuous feed oven 40 is shown in ghost outline so that the components therein may be more clearly seen.

The portions of composite material 36 are deposited on a PTFE coated steel belt 42 in the continuous feed oven 40. It is preferable that the portions of composite material 36 deposited on the PTFE coated steel belt 42 be about one-half inch thick so that subsequent heating of the portions of material 36 can take place rapidly. In order to accomplish this, the portions of composite material 36 are leveled to the desired height of ½ by a bridge as they enter the continuous feed oven 40.

The subsequent heating of the portions of composite material 36 occurs in the following manner. Within the continuous feed oven 40, there is a first series 44 of gas fired radiant heaters 48 located above the portion of the PTFE coated steel belt 42 that carries the portions of material 36 through the oven 40. This first series 44 of heaters 48 directly heats the mixture from above. There is also a second series 46 of heaters 48 below the lower portion of the PTFE coated steel belt 42. This second series of heaters 48 heat the portions of composite material 36 through the two layers of steel belt 42. The heaters in both the first series 44 and second series 46 of heaters 48 are preferably evenly spaced along the belt 42 with the number of heaters 48 being such that the heaters are placed close to one another so as to ensure even heating along the entire length of the belt 42.

After each portion of composite material 36 has passed through the continuous feed oven 40, they reach an outlet opening 50 and are removed from the steel belt 42 preferably by a computer controlled plough 52. The plough 52 removes each portion of material 36 from the belt 42 and directs each portion of material 36 into a heated receiving hopper 54 of an automatic batch discharge system. The amount of material in each portion 36 is, of course, the desired amount for forming the resulting molded paving block.

The portion of composite material 36 is then dumped from the receiving hopper 54 into a molding system where it is molded into a paving block. The molding system includes a mold 56, which in turn comprises a mold cavity 57 and mold plate 58. The mold cavity 57 receives the portion of composite material 36 therein when it is in position 57A. The mold cavity 57 is then moved underneath the mold plate 58 to position 57B. The mold plate 58 is introduced to the mold cavity 57 by a hydraulic ram and a seal is formed between the two. The mold plate 58 directly contacts the portion of material 36 therein. A pressure of about 750 p.s.i. is applied in order that the material is formed properly into the desired shape of a molded paving block. The mold cavity 57 is then moved to position 57C where the molded paving block is discharged onto a water bath cooling conveyor 59, where they are quickly cooled for handling purposes. The resulting paving block has a compressive strength of about 7000 p.s.i. preferred shape of the paving block is a rectangular prism, with the preferred sizes of these rectangular prism paving blocks being 200 mm long×100 mm wide×60 mm deep, and 200 mm long×100 mm wide×80 mm deep. With these rectangular prism paving blocks, a herringbone pattern can be created. A herringbone pattern has been found to be a preferable pattern for forming a road or other surface from rectangular prism blocks. Of course, virtually any suitable size block could be produced by the method disclosed herein.

Figure 2:
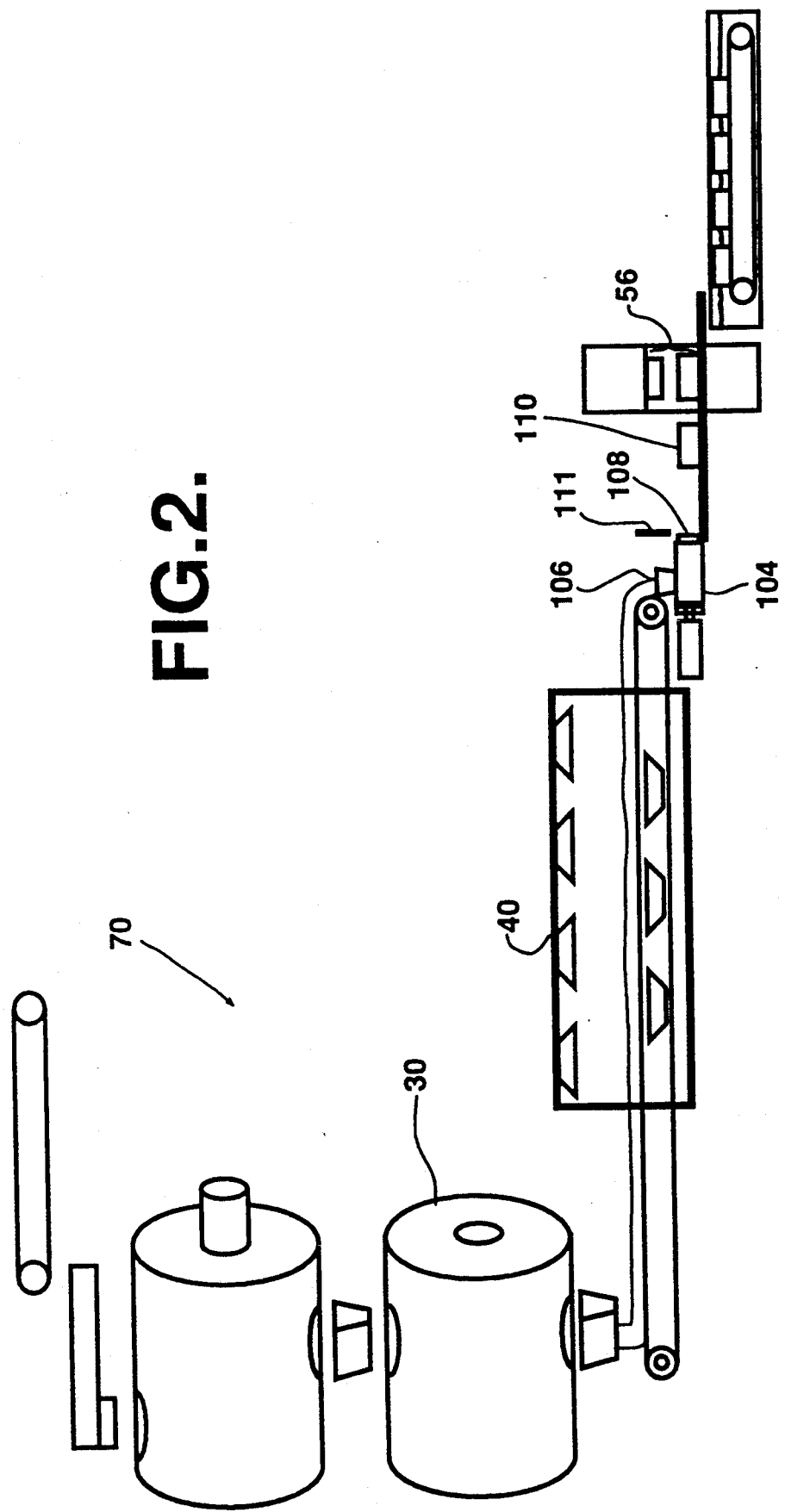
FIG. 2 is a schematic diagram of a second process used to produce the molded paving block of the present invention.

Reference will now be made to FIG. 2 which shows a second preferred process used to form the composite paving block of the present invention at production line 70. In this second preferred process, the composite material is discharged from the holding drum 30 in the form of a continuous ribbon of composite material. This continuous ribbon of composite material is deposited onto the travelling belt of the heating oven 40, wherein the composite material is allowed to temperature stabilize at a temperature of about 325° F. to about 375° F. The continuous ribbon of material is then discharged into an extruder 104 through an opening 106 in the top thereof. The composite material is extruded through a die 108 from the extruder 104 on a continuous basis. The extruded material is cut into slugs 110 of a desired size by a computer controlled cutting blade 111. The extruder 104 is preferably a linear extruder (as shown) with the piston of the extruder 104 being driven by hydraulic power. The extruder may also be a screw extruder, as dictated by performance and cost considerations. The main reason for the extruder is to pre-plasticize the composite material and force any gases from the material, before the pressurization in the mold.

The extruder is also preferably heated to the mixture at a temperature of about 325° F. to about 375° F. thereby allowing it to be more easily extruded. In any event, the extruder is preferably heated to keep the portion of composite material 36 at a proper temperature.

The slug 110 is then taken from the die 108 and placed into a mold 56 and is molded and subsequently cooled as described in the first preferred embodiment.

The paving block of the present invention preferably has vertically oriented sides so that when the blocks are assembled together to form a road or other surface, they can be moved in a vertical direction into location one next to another. Assembly of a road or other surface from blocks with vertically oriented sides provides a surface wherein individual blocks can be removed and replaced generally independently one from another.

The paving block of the present invention may also be of a shape other than the rectangular prism shape as disclosed in the preferred embodiment. In any event, the blocks are placed juxtaposed one to another in order to form a road or other surface. The blocks merely interfit one with another. They do not actually interlock as do the pieces of a typical jigsaw puzzle.

In an alternative embodiment the continuous feed oven has in it a conveyor belt with a plurality of generally contiguously placed trays thereon, in place of the PTFE coated steel belt as described in the preferred embodiment. Segments of the composite material would be placed in each tray on the conveyor, and would be conveyed in the same manner through the oven.

It is also contemplated that the material of the present invention comprising asphalt in a proportion of about 25% to about 55% by volume, polyethylene in a proportion of about 10% to about 40% by volume, monofilament fibre material in a proportion of about 5% to about 35% by volume, and elastomeric material in a proportion of 5% to about 30% by volume, could be used more generally as a construction material to form entities such as preformed slabs for buildings and the like.

Other modifications and alterations may be used in the design and manufacture of the paving block of the present invention without departing from the spirit and scope of the accompanying claims.

What is claimed is:

1. Molded composite paving blocks for use in paving roads, parking lots and driveways, comprising:
    reclaimed asphalt in a proportion of about 25% to about 55% by volume, polyethylene in a proportion of about 10% to about 40% by volume, monofilament fibre material in a proportion of about 5% to about 35% by volume, and elastomeric material in a proportion of 5% to about 30% by volume.

2. The molded composite paving block of claim 1, wherein said elastomeric material is chosen from the group of rubber and flexible polyvinylchloride.

3. The molded composite paving block of claim 1, wherein said asphalt is in a proportion of about 40% by volume, said polyethylene is in a proportion of about 25% by volume, said monofilament fibre material is in a proportion of about 20% by volume, and said elastomeric material is in a proportion of 15% by volume.

4. The molded composite paving block of claim 1, wherein said asphalt is a size of −4 mesh, said polyethylene is of a size of −10 mesh, said elastomeric material is of a size of −12 mesh.

5. The molded composite paving block of claim 1, wherein said polyethylene is recycled polyethylene, said elastomeric material is reclaimed elastomeric material, and said monofilament fibre material is reclaimed monofilament fibre material.

6. The molded composite paving block of claim 5, wherein said elastomeric material is reclaimed rubber from scrap tires.

7. The molded composite paving block of claim 5, wherein said elastomeric material is reclaimed flexible polyvinylchloride.

8. The molded composite paving block of claim 1, wherein said monofilament fibre material is reclaimed monofilament fibre material and is chosen from the group of rayon, nylon, and polyesters.

9. The molded composite paving block of claim 1, wherein said monofilament fibre material has a strand length of about ¼" to about ⅜".

10. The molded composite paving block of claim 1, wherein said monofilament fibre material is obtained from the cords of scrap tires.

11. Molded composite paving blocks for use in paving roads, parking lots and driveways, comprising:
    reclaimed asphalt in a proportion of about 25% to about 55% by volume, phenolic resin in a proportion of about 10% to about 40% by volume, monofilament fibre material in a proportion of about 5% to about 35% by volume, and elastomeric material in a proportion of 5% to about 30% by volume.

12. The molded composite paving block of claim 1, wherein said block has a compressive strength of about 7,000 p.s.i..

13. A process for manufacturing molded composite paving blocks, comprising the steps of:
    placing reclaimed asphalt and polyethylene into a heated blending drum;
    blending and heating said asphalt and said polyethylene at a temperature of about 130° F. until a relatively uniform mixture is obtained;
    adding an amount of elastomeric material and an amount of a monofilament fibre material to said mixture to obtain a composite material that is subsequently formed into said composite paving blocks;
    discharging portions of said composite material into a heating oven;
    allowing said composite material to temperature stabilize in said heating oven at a temperature of about 325° F. to 375° F.; and
    discharging said portions of said composite material from said heating oven and depositing said portions of composite material into a molding system and molding said portions of material into molded paving blocks.

14. The process of claims 13, wherein said heating oven is a continuous feed oven with a traveling belt that uses infrared heaters spaced along said oven so as to provide relatively even heating of said mixture as it travels through said oven.

15. The process of claim 13, further including the step of:
    applying a pressure of about 750 p.s.i. to each mold until said portion of composite material has set.

16. The process of claim 13, wherein said asphalt is waste reclaimed asphalt, said polyethylene is recycled polyethylene, said elastomeric material is reclaimed elastomeric material, and said monofilament fibre material, and said monofilament fibre material is reclaimed monofilament fibre material.

17. The process of claim 13, wherein said elastomeric material is reclaimed rubber from scrap tires.

18. The process of claim 13, wherein said monofilament fibre material is obtained from the cords of scrap tires.

19. The process of claim 13, wherein said elastomeric material is reclaimed flexible polyvinylchloride.

20. A process for manufacturing molded composite paving blocks, comprising the steps of:
placing reclaimed asphalt and polyethylene into a heated blending drum;
blending and heating said asphalt and said polyethylene at a temperature of about 130° F. until a relatively uniform mixture is obtained;
adding an amount of elastomeric material and an amount of a monofilament fibre material to said mixture to obtain a composite material that is subsequently formed into said composite paving blocks;
discharging a continuous ribbon of said composite material into a heating oven;
allowing said composite material to temperature stabilize in said heating oven at a temperature of about 325° F. to 375° F.; and
discharging said continuous ribbon of said composite material from said heating oven and depositing said composite material into an extruder;
pre-plasticizing and extruding said composite material;
cutting said extruded composite material into a slug of desired size as it exits said extruder; and
depositing said slug into a molding system and molding said material into molded paving blocks.

21. The process of claim 20, wherein said extruder is a heated extruder that keeps said mixture at a temperature of about 325° F. to about 375° F. thereby allowing it to be more easily extruded.

22. The process of claim 20, wherein said extruder is a linear extruder.

23. The process of claim 20, wherein said extruder is a screw extruder.

24. A process for manufacturing molded composite paving blocks, comprising the steps of:
placing reclaimed asphalt and phenolic resin into a heated blending drum;
blending and heating said asphalt and said phenolic resin at a temperature of about 130° F. until a relatively uniform mixture is obtained;
adding an amount of elastomeric material and an amount of a monofilament fibre material to said mixture to obtain a composite material that is subsequently formed into said composite paving blocks;
discharging portions of said composite material into a heating oven;
allowing said composite material to temperature stabilize in said heating oven at a temperature of about 325° F. to 375° F.; and
discharging said portions of said composite from said heating oven and depositing said portion of composite material into a molding system and molding said portion of material into a molded paving block.

25. A process for manufacturing molded composite paving blocks, comprising the steps of:
placing reclaimed asphalt and phenolic resin into a heated blending drum;
blending and heating said asphalt and said phenolic resin at a temperature of about 130° F. until a relatively uniform mixture is obtained;
adding an amount of elastomeric material and an amount of a monofilament fibre material to said mixture to obtain a composite material that is subsequently formed into said composite paving blocks;
discharging a continuous ribbon of said composite material into a heating oven;
allowing said composite material to temperature stabilize in said heating oven at a temperature of about 325° F. to 375° F.; and
discharging said continuous ribbon of said composite material from said heating oven and depositing said composite material into an extruder;
extruding said composite material;
cutting said extruded composite material into a slug of desired size as it exits said extruder; and
depositing said slug into a molding system and molding said material into molded paving blocks.

26. A construction material, comprising:
reclaimed asphalt in a proportion of about 25% to about 55% by volume, polyethylene in a proportion of about 10% to about 40% by volume. monofilament fibre material in a proportion of about 5% to about 35% by volume, and elastomeric material in a proportion of 5% to about 30% by volume.

* * * * *